Jan. 10, 1961 K. J. WALDSCHMIDT 2,967,960
SUBMERSIBLE MOTORS AND METHOD OF FABRICATING THE SAME
Filed May 8, 1957 2 Sheets-Sheet 1
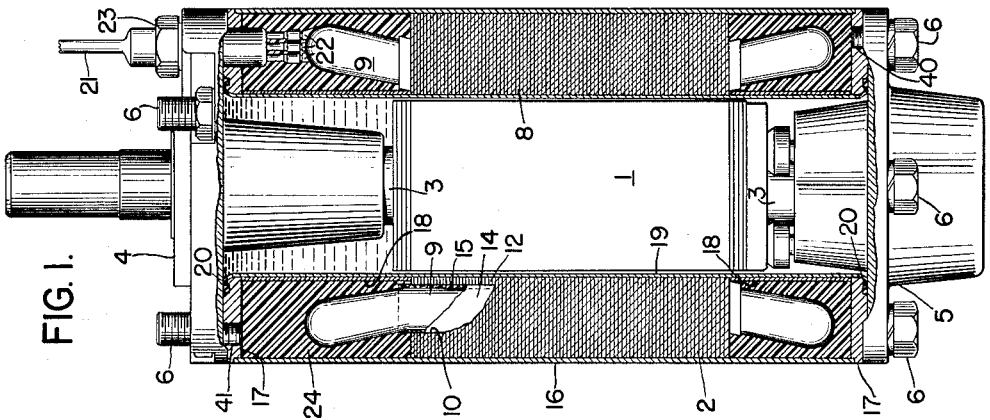
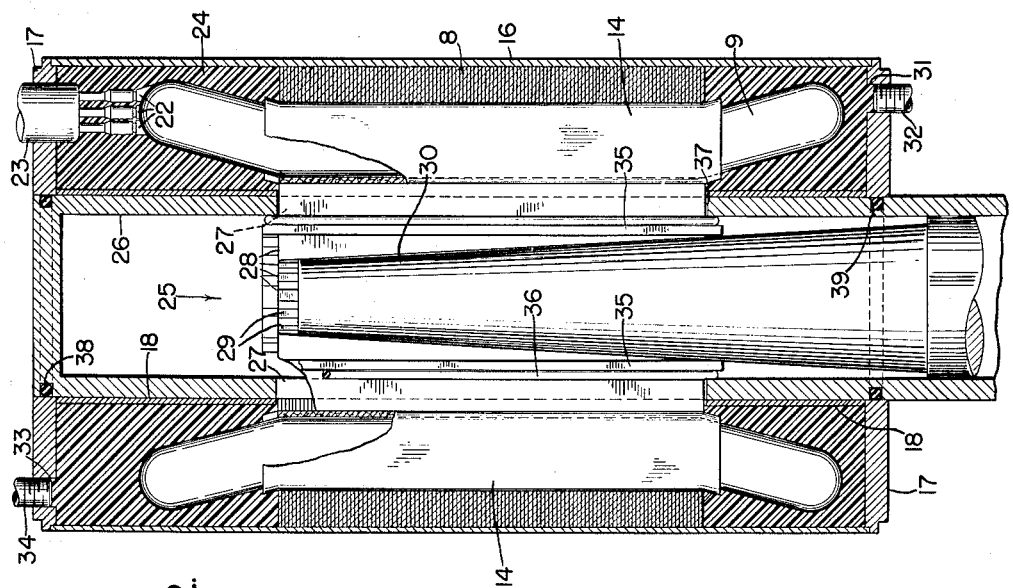
INVENTOR.
KENNETH J. WALDSCHMIDT
BY
Andrus & Scales
Attorneys Jan. 10, 1961 K. J. WALDSCHMIDT 2,967,960
SUBMERSIBLE MOTORS AND METHOD OF FABRICATING THE SAME
Filed May 8, 1957 2 Sheets-Sheet 2
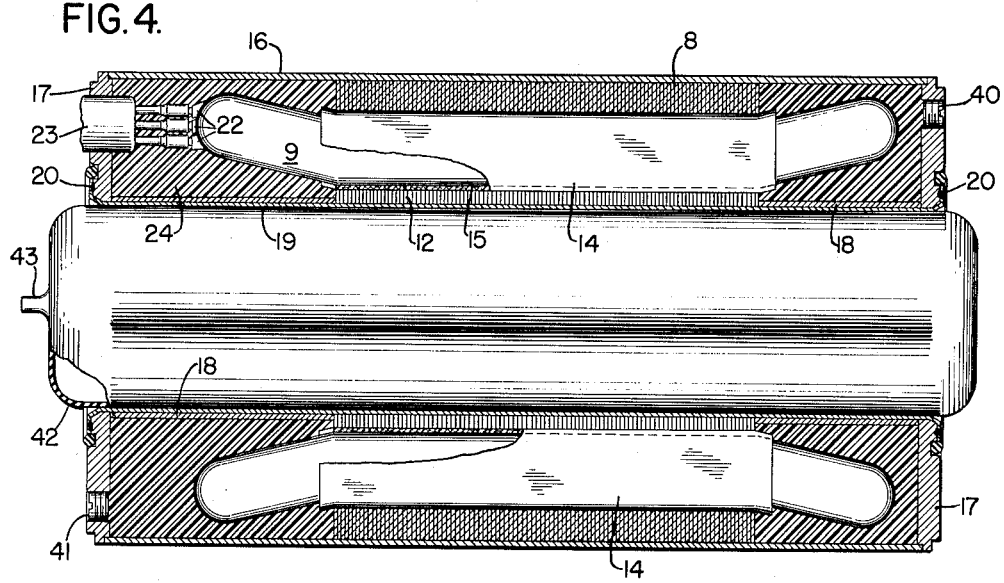
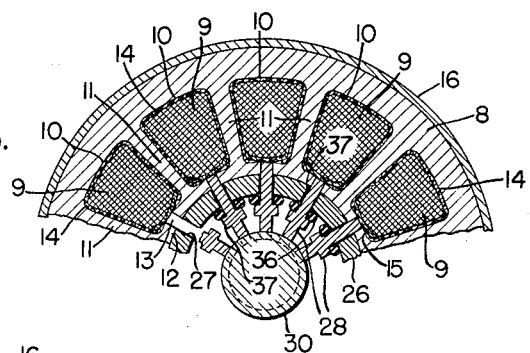
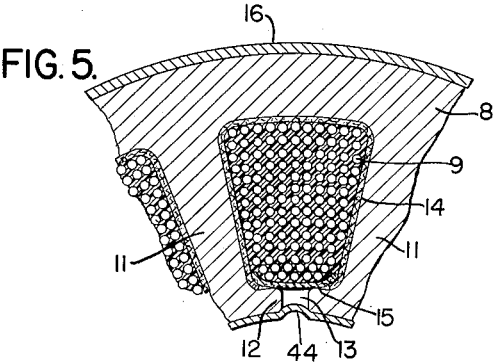
INVENTOR.
KENNETH J. WALDSCHMIDT
BY
Andrus & Sceales
Attorneys : 2,967,960
Patented Jan. 10, 1961

2,967,960

SUBMERSIBLE MOTORS AND METHOD OF FABRICATING THE SAME

Kenneth J. Waldschmidt, Milwaukee, Wis., assignor to A. O. Smith Corporation, Milwaukee, Wis., a corporation of New York Filed May 8, 1957, Ser. No. 657,922

7 Claims. (Cl. 310—86)

This invention relates to a submersible motor having a liner separating the motor into a stator chamber and a rotor chamber.

The stator winding in submersible motors must be protected from the well liquid and the like to prevent short circuiting of the winding. On the other hand, the rotor winding is conventionally a squirrel cage variety and need not be protected from the liquid.

The present trend in submersible motors is to fabricate them with a separate stator chamber which is hermetically sealed to protect the stator winding and a separate rotor chamber which contains a suitable lubricating liquid to lubricate the motor bearings. A thin stainless steel liner is often employed between the rotor and the stator chambers to hermetically close the stator chamber. To dissipate the heat generated by the stator winding, the stator chamber is completely filled with a plastic cured resin having a high heat transfer characteristic.

Some of the more suitable plastic fillers have a tendency to form a high bond to the thin liner. This has been thought to advantageously support the liner and allow the use of a thinner liner and thereby reduce the necessary air gap between the rotor and the stator. However, if the liner has a different coefficient of expansion than the other metal components, the liner may break away from the adhesive plastic filler. Further, even though the liner has the same coefficient of expansion, the temperature of the liner may differ from the temperature of the other components due to heat generated by eddy currents in the liner or due to the cooling of the liner by the rotor liquid. This temperature difference can establish a different expansion of the components and separate the liner from the plastic filler. The liner necessarily bulges outwardly because the stator is completely filled with the plastic and provides a solid backing wall to the liner. Because of the small air gap between the rotor and the stator, even a small bulge brings the liner into contact with the rotor. Eventually, the rotor wears an opening in the liner and thereby opens the stator chamber to the rotor liquid. As fillers normally used in stator chambers are not entirely impervious to liquid, the liquid reaches the stator winding and short circuits the winding.

The heat generated by motor operation also expands the plastic filler, particularly under conditions of abnormal motor operation when overheating of the motor may occur. The plastic filler then pushes outwardly on the liner and forces the liner outwardly into contact with the rotor which wears an opening in the liner.

In accordance with the present invention, the stator chamber is filled with a plastic which may have a relatively high metal adhesion characteristic. However, during the filling and the curing of the plastic a mandrel is employed to prevent the plastic from completely filling the entrance to the stator slots. The thin metal liner is then inserted within the bore of the stator assembly and expanded outwardly into intimate contact with the stator core and bulging into the stator slots. However, the projection into the stator slots is such that a space exists between the plastic and the liner. This allows the liner to expand and contract into the slots during the motor operation.

Further, when the plastic expands due to the heat of motor operation, the plastic moves harmlessly into the space between the liner and the adjacent plastic surface. Consequently, the liner is never forced into contact with the rotor and indefinitely maintains a sealed stator chamber.

The expansion of the liner into the slots also establishes a corrugated liner and thereby increases the mechanical strength of the liner as a column and permits higher axial loads on the liner.

If an oven cured plastic variety is to be set in the stator chamber and a metal mandrel is employed during the curing operation, heat is advantageously put into the plastic by heating the mandrel as well as the outer metal surfaces of the stator enclosure. This results in a more uniform heat distribution within the plastic resin during the curing operation.

The accompanying drawings illustrate the best mode presently contemplated by the inventor for carrying out the invention.

In the drawings:

Fig. 1 is a cross-sectional view of a submersible motor;

Fig. 2 is a cross-sectional view of the stator of Fig. 1 and a mandrel assembly employed during the potting of the plastic filler;

Fig. 3 is an enlarged fragmentary view of a portion of the stator and mandrel;

Fig. 4 is a cross-sectional view of a potted stator having a liner expanded therein; and Fig. 5 is an enlarged fragmentary view of the completed stator.

Referring to the drawings and particularly Fig. 1, a submersible motor is illustrated which is adapted to be lowered into a well and submerged in the well liquid. The motor comprises a cylindrical rotor 1 rotatably disposed within the bore of an annular stator assembly 2. A shaft 3 extends axially from opposite ends of the rotor 1 and is journaled in an upper radial bearing assembly 4 and a lower radial bearing assembly 5. The bearing assemblies 4 and 5 are secured to the respective ends of the stator assembly by a plurality of bolt and stud assemblies 6. The shaft 3 projects outwardly through the upper bearing assembly 4 and is connected to drive a suitable pump, not shown, to pump the well liquid.

The rotor 1 is a conventional induction type of rotor having a squirrel cage winding, not shown, such that the rotor winding may operate submerged in a liquid which serves to lubricate the bearing surface of assemblies 4 and 5.

The stator assembly 2 includes a laminated annular magnetic core 8 carrying a field winding 9 which is arranged within a plurality of circumferentially spaced axial slots 10. As shown more clearly in Figs. 1, 3, and 5, the slots 10 are formed by a plurality of axially extended teeth 11. Each of the teeth 11 have a pair of oppositely extending circumferential lips 12, each of which cooperate with an adjacent lip to form a restricted opening 13 to each of the slots 10. An insulating paper liner 14 covers the inside and base surfaces of the slots 10 to insulate the winding 9 from the core 8. A slot stick 15 of an electrical insulating fiber or the like closes each of the slots 10 by bearing on the interior surface of the teeth lips 12. The slot sticks 15 securely lock the winding 9 within the slots 10 and also serve to insulate the winding from the adjacent core surfaces of the lips 12.

The core 8 is secured within a tubular frame 16 which extends axially from the core past the ends of the field winding 9. Annular end plates 17 are secured to opposite ends of the frame 16 and backing rings 18 extend from the inner periphery of the annular plates to the axial ends of the core 8 to enclose the ends of the stator winding 9. A thin metal liner 19 of stainless steel or other suitable material is expanded within the bore of the stator core 8 and the end plates 17. The liner 19 is welded to the end plates 17 by a circumferential weld 20 to hermetically seal the stator winding 9 between the frame 16 and the liner 19.

The metal liner 19 is of any suitable non-magnetic material to minimize the leakage flux of the stator. The conventional material employed is stainless steel having a minimum thickness. A stainless steel liner having .006 thickness has given highly satisfactory results with the present invention.

A power cable 21 is connected to the leads 22 of winding 9 through an opening in the upper end plate 17 and a sealing connector plug 23 hermetically closes the opening to prevent liquid leakage into the stator chamber.

A plastic resin 24 fills the voids within the slots 10 and also the space defined about the end projections of the winding 9. The plastic serves as a heat transfer medium to dissipate the heat generated within the winding.

Operation of the motor results in the generation of heat which increases the temperature of the liner 19 and the adjacent metal components. The expansion of the stainless steel liner may be different than the adjacent components, as previously described. Consequently, the liner 19 tends to bulge or pop outwardly toward the rotor. Because of the small air gap or clearance between the stator core 8 and the rotor 1, a very slight bulge of the liner 19 contacts the rotor which then wears an opening in the liner. This disrupts the hermetic seal and the motor winding 9 is thereafter shorted out by leakage of well liquid to the winding.

In accordance with the present invention the restricted openings 13 are maintained as a free space for expansion and contraction of the liner 19 as follows: During manufacture of the stator assembly 2, a mandrel 25 is disposed within the bore of the annular stator core 8 while filling and curing the stator plastic, as shown in Fig. 2. The mandrel 25 includes a tubular sleeve 26 having an outer diameter corresponding generally to the bore of the stator core 8. The sleeve 26 is coaxially disposed within the stator bore and provided with a plurality with a plurality of circumferentially spaced radial slots 27 which are aligned with the restricted openings 13 of the slots 10. A radially movable insert 28 having a circumferential dimension equal to the restrictive openings is slidably disposed one within each of the radial slots 27. The radially inner edge 29 of the inserts 28 are tapered and are adapted to ride upon an axially movable tapered wedge 30. The inserts 28 move radially into and out of the restricted openings in response to longitudinal or axial movement of the wedge 30.

In preparing for the curing of the plastic resin 24, the mandrel 25 is assembled with the core and winding but without the liner 19 in place as shown in Fig. 2. The inserts 28 are coated with a suitable mold release agent, not shown, prior to the assembly to prevent adhesion of the plastic to the inserts. The inserts 28 are then moved radially outwardly to fill the restricted openings 13. The plastic resin 24 is then forced into the assembly through an opening 31 in the end plate 18. The opening 31 is connected by a conduit 32 to a suitable source of plastic not shown. An opening 33 is also provided in the opposite end plate 17 and is connected to a vacuum device, not shown, by a conduit 34 to draw the air from within the stator chamber and force the plastic into the stator chamber.

The mandrel 25 is sealed to prevent entrance of air into the stator chamber while filling the chamber with plastic as follows. Each insert 28 is provided with an encircling shoulder 35 inwardly of the sleeve 26. An O-ring seal 36 is disposed between the shoulder and the sleeve. When the inserts 28 are forced into the slot openings 13, the shoulder 35 compresses the associated O-rings 36 and positively seals the passages 37 between the inserts 28 and the sleeve 26. Packing seals 38 and 39 are also provided respectively between each of the end plates 17 and the adjacent sleeve 26 to prevent entrance of air into the stator chamber along the outer surface of the sleeve.

The plastic 24 completely fills all voids within the slots 10 as shown in Fig. 5, as well as the space surrounding the end projections of winding 9. The plastic resin 24 is then cured to a solid mass with the inserts 28 maintaining the slot openings 13 free of the plastic. The openings 31 and 32 are subsequently closed with suitable plugs 40 and 41, respectively to seal the openings, as shown in Figs. 1 and 4.

If heat is externally applied to cure the plastic resin 24, the mandrel 25 and the inserts 28 thereof are also heated to establish a more uniform distribution within the plastic during the curing thereof.

After the plastic is cured, the inserts 28 are withdrawn and the mandrel 25 is removed and the thin metal liner 19 inserted into the bore of the stator assembly 2 to be welded in place.

Referring now to Fig. 4, prior to the welding of the liner 19 to the end plates 17, a collapsible bag 42 of suitable flexible material is disposed within the bore of the stator assembly 2. The bag 42 is of a generally tubular shape to entirely fill the bore of the stator and to completely engage the liner 19. A valved opening 43 on one end of the bag 42 is connected to a suitable fluid source, not shown, to expand and collapse the bag. When the bag 42 expands, it forces the liner 19 into intimate contact with the adjacent surface of the stator core 8 and the backing rings 18. The liner 19 is also forced somewhat into each of the restricted openings 13 to provide longitudinal ribs or projection 44 on the liner, as shown most clearly in Fig. 4. The expansion of the bag is suitably controlled to establish a free space between the slot sticks 15 and the innermost end of the projections 44. The free space permits unrestricted expansion and contraction of the liner 19 into the slot openings 13 when the liner is respectively heated and cooled by intermittent motor operation.

As previously described, a submersible motor which is disposed within a well and alternately stopped and started, establishes corresponding cycles of heating and cooling due to the energization of winding 9. The thin metal liner 19 expands and contracts at a different rate than the adjacent material surface. Consequently, if not compensated for in some manner, the liner 19 tends to buckle outwardly and come into contact with the rotor 1. Eventually the rotor 1 wears through the liner 19 and allows liquid to enter into the stator chamber and destroy the stator winding. This would require removal of the motor and complete replacement of the stator assembly. However, with the present invention, the liner freely expands and contracts into the restricted openings and consequently never comes into contact with the rotor.

Further, the free space defined within the slot openings 13 serves as a relief chamber to accommodate expansion of the plastic filler or resin 24 under conditions of motor operation. This prevents the expanding plastic filler 24 from forcing the liner 19 outwardly into contact with the rotor 1.

The present invention provides a long life submersible motor having a thin metal liner.

Various modes of carrying out the invention are contemplated as being within the scope of the following claims particularly pointing out and distinctly claiming the subject matter which is regarded as the invention.

I claim:

1. In a submersible dynamoelectric machine having an annular stator core with a plurality of circumferentially spaced longitudinal winding slots and a field winding arranged within the slots through restricted slot openings and axially extended from the core, an enclosure having a pair of concentric tubes disposed adjacent the outer and inner core surfaces and hermetically joined to a pair of end plates axially disposed in spaced relation to said winding to hermetically seal off the winding, a high heat transfer resin filling said enclosure except for said restricted slot openings to transfer the heat from the windings to the enclosure surfaces, and radial grooves in said liner mating with said slot openings and having less depth than said opening to allow free expansion of the liner into and out of the slots.

2. In a submersible dynamoelectric machine having an annular stator core carrying a winding arranged within a plurality of circumferentially spaced slot openings having restricted radial openings, a pair of concentric tubes radially confining the stator core and winding therebetween, a pair of end caps secured one each to opposite ends of said tubes to hermetically enclose the winding and having axially extending backing members disposed between the end caps and the core adjacent the inner tube, said core and backing members supporting the inner of said tubes, the inner of said tubes being formed of a thin non-magnetic material to minimize the leakage flux in the air gap in the machine and being radially expanded partially into said restricted openings, and a plastic filler disposed within the space defined by said concentric tubes except for said restricted openings to dissipate the heat generated by the field winding.

3. A method of fabricating a potted stator assembly for a submersible dynamoelectric machine, which comprises assembling the stator assembly without the liner and with a means disposed in the slot openings to prevent entrance of matter from the slots to the slot openings, filling and setting a protecting material within the stator assembly, and then expanding a liner into contact with the inner bore of the stator.

4. A method of fabricating a potted stator assembly for a submersible dynamoelectric machine, which comprises assembling the stator assembly without the liner with a mandrel having removable inserts disposed within the slot openings, potting the stator assembly with a plastic resin, and then expanding a liner into intimate contact with the inner bore of the stator and into the unpotted slot opening.

5. A method of fabricating a potted stator assembly for a submersible dynamoelectric machine, which comprises assembling the stator assembly without the liner and with a means disposed in the slot openings to prevent entrance of matter from the slot to the slot openings, potting the stator slots and the stator end enclosures with a plastic, and then expanding a liner into contact with the inner bore of the stator and into the unpotted slot openings.

6. A method of potting a stator core and winding carried thereby within a metal housing having a thin metal liner coaxially disposed within the core and constituting one wall of the housing, which comprises assembling the housing with the core and winding therein and with the liner removed with a metal mandrel having a wall replacing said liner and having radially extending inserts disposed within the slot openings, filling said housing with a thermal setting plastic resin, simultaneously heating said housing and said mandrel to set said plastic, removing said mandrel, and expanding said liner into the bore of the stator core and partially into the slot openings.

7. A method of manufacturing a hermetically sealed annular stator assembly comprised of a metallic housing and an annular core structure carrying electric windings disposed within inner longitudinal slots and extended at each end of the core and a thin inner bore liner secured to a housing to hermetically seal the core and windings within the housing and a potted resin disposed within the housing to establish a heat transfer medium to carry away the heat generated within the winding, which comprises curing the resin with the liner removed and with inserts disposed within each of the slot openings to prevent potting of resin therein, and subsequently expanding the liner against the inner bore of the core and partially into said open slots to establish a space between said liner and the cured resin.

References Cited in the file of this patent

UNITED STATES PATENTS

| 2,562,283 | Sawyer | July 31, 1951 |
| 2,654,848 | Schaefer | Oct. 6, 1953 |
| 2,698,911 | Schaefer | Jan. 4, 1955 |

FOREIGN PATENTS

| 429,641 | Great Britain | June 4, 1935 |
| 656,216 | Great Britain | Aug. 15, 1951 |